United States Patent
Funahashi

(10) Patent No.: US 6,317,193 B2
(45) Date of Patent: *Nov. 13, 2001

(54) IMAGE FORMING APPARATUS

(75) Inventor: Hiroyuki Funahashi, Nagoya (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,951

(22) Filed: Nov. 30, 1998

(30) Foreign Application Priority Data

Dec. 10, 1997 (JP) .................................................. 9-340094

(51) Int. Cl.[7] ............................. G03B 27/52; G06K 15/00
(52) U.S. Cl. ............................................. 355/40; 358/1.14
(58) Field of Search ............................... 355/27–29, 40, 355/41, 77; 358/1.16, 296, 404, 444; 395/110, 114, 115

(56) References Cited

U.S. PATENT DOCUMENTS

| 5,235,676 | * | 8/1993 | Clay et al. | 395/113 |
| 5,973,790 | * | 10/1999 | Ichinowatari | 358/402 |
| 6,023,343 | * | 2/2000 | Hoang et al. | 358/1.16 |
| 6,055,067 | * | 4/2000 | Matsuda et al. | 358/468 |
| 6,064,490 | * | 5/2000 | Minamizawa | 358/1.14 |

* cited by examiner

Primary Examiner—David M. Gray
Assistant Examiner—Hung Henry Nguyen
(74) Attorney, Agent, or Firm—Oliff & Berridge, PLC

(57) ABSTRACT

An image forming apparatus is provided to smoothly form images corresponding to received image data even if the memory becomes full when collated printing is executed. If the memory never becomes full during collated printing, images for all of the pages are expanded to intermediate data, stored in a page memory, and complete collated printing is enabled. In the meantime, if the memory becomes full while the print data of part of a page is expanded to intermediate data and stored, the controller, controls so that the page memory can be written after collated printing is executed up to a page immediately before the partial page and the residual pages are printed in the form of collated printing. Therefore, even if the memory becomes full, printing can be executed in a form as close to collated printing as possible.

18 Claims, 12 Drawing Sheets

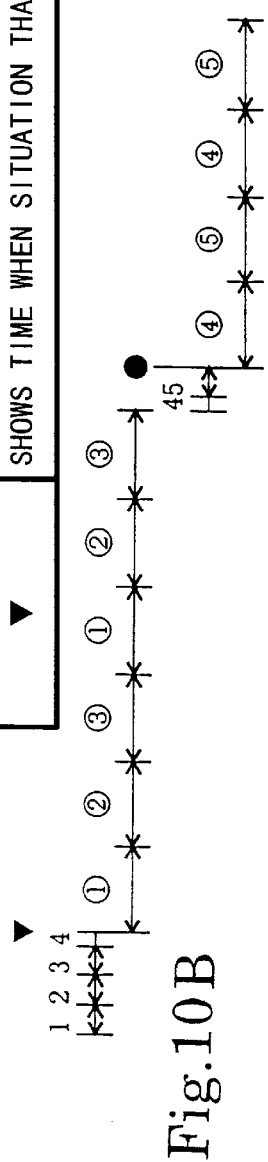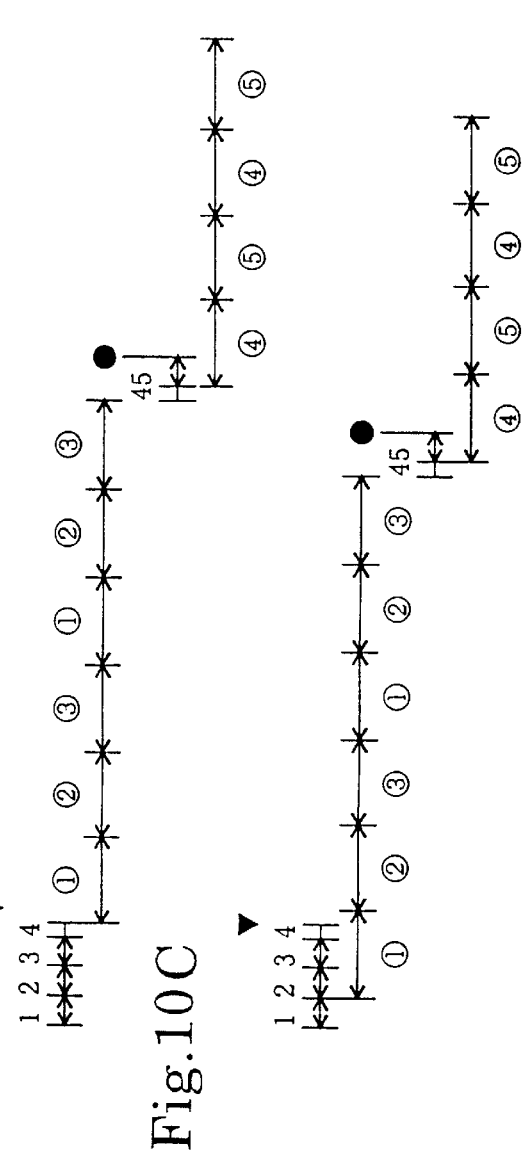
Fig.10A
Fig.10B
Fig.10C

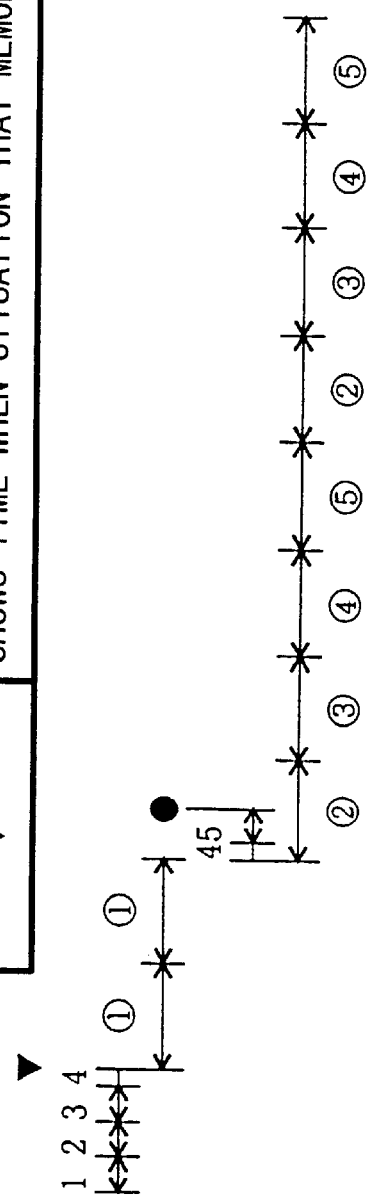

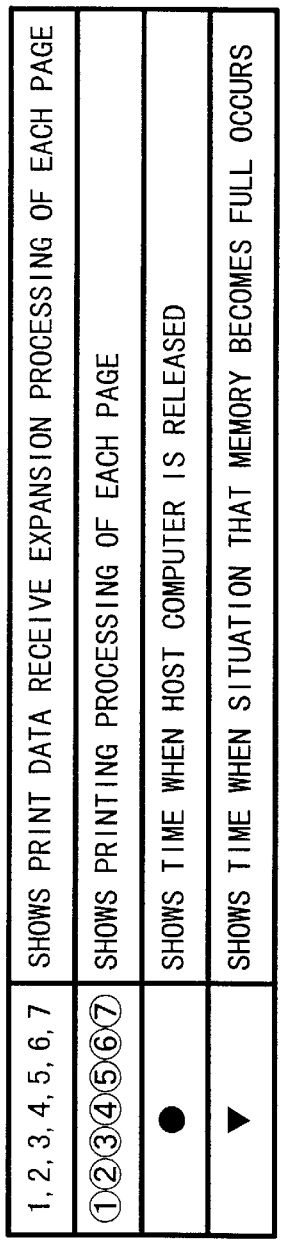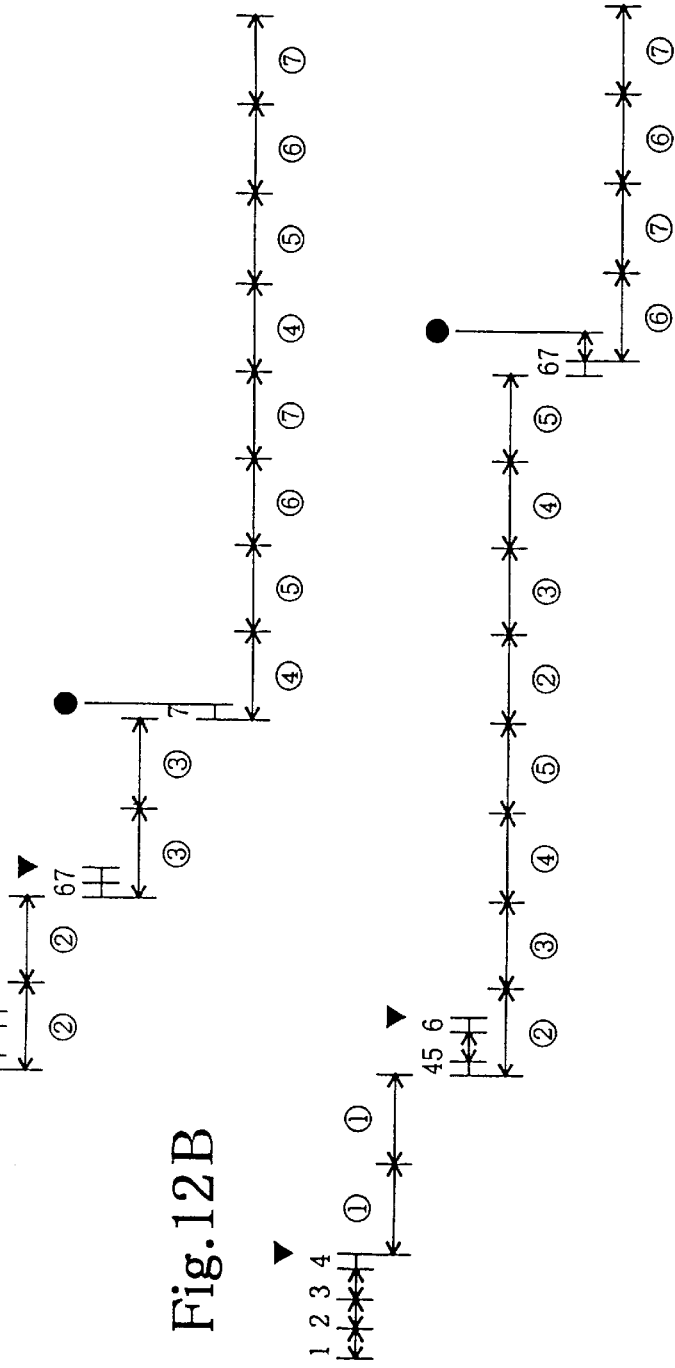
Fig.12A
Fig.12B

IMAGE FORMING APPARATUS

BACKGROUND OF THE INVENTION

1. Field of Invention

The invention relates to an image forming apparatus for forming an image on a recording medium based upon image data, and more particularly relates to an image forming apparatus which is provided with a storage device for storing image data provided to form an image and which can form multiple images corresponding to image data stored in the storage device.

2. Description of Related Art

Heretofore, an image forming apparatus is provided with an image forming device for forming an image on a recorded medium based upon image data, a storage device for storing image data, a receiving device for receiving the image data stored in the storage device, and a controller for storing all of the image data received by the receiving device in the storage device if multiple images corresponding to the image data are required to be formed and for controlling the process so that the image forming device is driven multiple times based upon the stored image data.

In this type of image forming apparatus, image formation is enabled by storing all of the image data received via the receiving device, such as an interface, in the storage device, such as a memory, and controlled so that the image forming device such as a printer engine, is driven based upon the stored image data, multiple times. That is, as all of the image data is stored in the storage device, a copy of the images from the first page to the final page is formed and then, the number of desired copies of the images are formed by repeating the similar operation, multiple times. In this case, so-called collated printing (also called sort printing) wherein images from a first page to a final page are sequentially formed and stacked.

Also, in this case, as all of the image data is stored in the storage device, image data is not required to be sent from a computer, and the like, multiple times. Therefore, if the image forming apparatus is used in a printing system in which multiple computers and one printer (one image forming apparatus) are connected via a local area network (LAN), and the like, a series of image data from the first page to the final page only needs to be sent from a computer once.

However, in this type of image forming apparatus, when the storage capacity of the storage device is full while all of the image data is stored in the storage device, subsequent processing is disabled. In this case, the image forming apparatus may be halted with an error message displayed. If such a situation occurs, image data is required to be divided into small parts and sent again from a computer and the like, and collated printing in a smaller unit is required to be executed. In this case, sending image data by a computer, and the like, is troublesome.

An image forming apparatus that performs so-called stack printing in which desired copies of images are sequentially formed (i.e., multiple copies of a first page are printed, then a second page, etc.) can switch its operational mode from collated printing to stack printing at the beginning of a print job. However, in this case, image data is required to be re-sent. Further, in this case, before the image data is sent again, the setting of the image forming apparatus and data sent together with the image data for specifying a printing method and the like, are required to be changed. Therefore, in this case, a user is also required to perform a complicated task. Further, if the above situation occurs and the image forming apparatus is halted, image data cannot be sent from another computer, and the like. In this case, the entire system process is inconveniently halted.

SUMMARY OF THE INVENTION

The invention provides an image forming apparatus wherein even if the storage capacity of the storage device is full when printing of multiple copies, such as collated printing, is executed, images corresponding to received image data can be smoothly formed.

The invention is based upon an image forming apparatus provided with an image forming device for forming images onto a recording medium based upon the image data, a receiving device for receiving the image data, a storage device that stores the image data received by the receiving device. and a controller device for storing all of the image data received by the receiving device in the storage device, and controlling so that the image forming device is driven based upon the stored image data, multiple times if multiple copies of images corresponding to the image data are to be formed. When the storage capacity of the storage device is full while all of the image data received by the receiving device is stored in the storage device, the controller controls so that the image forming device is driven based upon image data for at least one page already stored in the storage device, multiple times, deletes the image data of the page provided for the above driving from the storage device, and stores the continuation of the above received image data in the storage device.

According to the invention, if multiple copies of images corresponding to image data are required to be formed, the controller normally stores all of the image data received by the receiving device in the storage device and controls so that the image forming device is driven based upon the stored image data, multiple times. Therefore, images corresponding to the image data can be formed in multiple copies by collated printing, and the like.

When the storage capacity of the storage device is full while all of the image data received by the receiving device is stored in the storage device, the controller controls so that the image forming device is driven based upon image data for at least one page stored already stored in the storage device, multiple times, deletes the image data of the page provided for the above driving from the storage device and stores the continuation of the above received image data in the storage device. That is, if the image forming device is driven based upon image data for at least one page already stored in the storage device, multiple times, the images of the page can be formed for multiple copies. Then, storage of the image data of the formed images becomes unnecessary and deletion of the data is permitted. The controller deletes the image data of the page provided for the above driving from the storage device and stores the continuation of the received image data in the storage device. Then, forming images based upon the continuation of the image data is permitted.

As described above, according to the invention, if the storage capacity of the storage device is full when printing multiple copies, such as in collated printing, the corresponding image data of printed images that is stored is deleted, and new image data is stored. Therefore, even if the above storage capacity is full, images corresponding to all of the image data received by the receiving device can be smoothly formed.

The deletion of image data described in the invention entails the management data of a page to be deleted from a memory management table showing which storage area in the storage device, the image data of each page is stored. That storage area will be occupied until it is released and new image data is written therein. That is, when storage of the continuation of the above image data to the released storage area is allowed. Therefore, contents (image data) themselves (itself) stored in the storage device are/is not deleted (for example, null data and the like are not substituted). However, it is natural that the above contents may be also positively deleted (cleared) by substituting null data and the like.

A page described in the invention maybe an image formation unit (an image output unit) in the image forming apparatus, for example, if one side of a recorded medium is printed, a page is the side and if both sides of a recorded medium are printed, pages are a pair of sides equivalent to both sides. In the case of a dual page print, that is, if one recorded medium is divided into two parts in the center and printing for two pages is executed, image data for two pages printed on one recorded medium becomes one image formation unit.

In addition, when the storage capacity of the storage device is full while all of the image data received by the receiving device is stored in the storage device, the controller controls so that the image forming device is driven based upon a series of image data for pages stored in the storage device in a complete form, multiple times, deletes the image data provided for the above driving from the storage device, and stores the continuation of the above received image data in the storage device.

According to the invention, when the storage capacity is full, the controller controls so that the image forming device is driven based upon a series of image data for pages stored in the storage device in a complete form, multiple times. Therefore, images corresponding to a series of image data for pages once stored in the storage device in a complete form can be formed for collated printing. Afterward, the controller deletes image data provided for the above driving from the storage device, and stores the continuation of the above received image data in the storage device.

Therefore, even if the storage capacity is full, images corresponding to all of the image data received by the receiving device can be smoothly formed in a form as close to collated printing as possible. That is, if the storage capacity is full, complete collated printing is disabled. However, according to the invention, printed matter after images are formed can be brought close to the form of collated printing by an extremely small adjustment. Also, according to the invention, image data for pages stored in a complete form when the storage capacity is full is provided to the image forming device which is driven under control, and the corresponding images are formed. Therefore, a user can know on which page the above storage capacity becomes full when image data is stored to the page. Therefore, when a user sends the similar image data to an image forming apparatus again, he/she can delimit the image data in a suitable place and can increase the storage capacity of the storage device.

Therefore, printed matter in the form of collated printing can be more readily formed and a guide when the similar image data is sent again, can be provided.

In addition, when the storage capacity of the storage device is full while all of the image data received by the receiving device is stored in the storage device, the controller controls so that the image forming device is driven based upon the image data of a first page already stored in the storage device, multiple times, deletes the image data of the first page from the storage device, and stores the continuation of the above received image data in the storage device.

Therefore, images corresponding to only the image data of the first page already stored in the storage device, can be formed for multiple copies. Afterward, the controller deletes the image data of the first page from the storage device and stores the continuation of the above received image data in the storage device.

Generally, a busy signal and the like are output to the host computer when the storage capacity of the storage device becomes full and the host computer is instructed that the sending of the residual data is interrupted. Thus, the host computer cannot complete the sending of print data and is kept waiting while printing is continued. At this time, if a part of the data stored in the storage device can be deleted by completing the printing of image data for at least a page stored in the storage device, more data can be received from the host computer.

That is, as time required for the printing is fairly long if all of the copies for complete pages stored when the storage capacity of the storage device is full, are printed, the host computer may be required to wait for a long time though only a small quantity of data is left. However, if printing processing for even one page is finished earlier, the possibility that the host computer can be released early is high. For example, possibility that even only a small amount of data cannot be sent though printing is completed, is reduced. Therefore, the image forming apparatus can start receiving new date for the next print job, early.

In addition, in general printed matter, relatively complicated decorative images are often formed on the first page to attract attention. In such printed matter, image data corresponding to images on the first page may be extremely large, compared with image data on another page. In this case, the image data of pages except for the first page can be all stored in the storage device. In the invention, when the storage capacity becomes full, only the image data of a first page already stored is provided for the driving of the image forming device under control. Then, the image data of the page is deleted from the storage device and the image data of another page is stored. Therefore, if the above printed matter is printed, multiple copies of images on the first page are continuously formed and images on the next page and the following pages can be formed in the form of collated printing. Therefore, all of the printed matter can be brought close to the form of collated printing by an extremely small adjustment.

Therefore, the possibility that processing of new data for the next print job can be started early is high and if decorative images are formed on the first page, printed matter in the form of collated printing can be produced.

In the invention, if the storage capacity of the storage device becomes full again when the image data of the first page is deleted from the storage device and the continuation of image data is stored, control by any of the following methods may be executed. That is, the image forming device may be driven based upon a series of image data for pages stored in the storage device in a complete form, multiple times under control. In addition, the image forming device may also be driven based upon the image data of the first page of pages stored in the storage device. In the case of the former, even if image data uniformly exists in all of the printed matter, the possibility that the storage capacity of the storage device becomes full afterward is small, and all of the printed matter can be readily brought close to the form of collated printing by a small adjustment. In the case of the latter, the possibility that the host computer will be kept waiting for a long time although only a small quantity of data is left when the storage capacity of the storage device becomes full, is reduced, new data may be received for the next print job early, and if the image data of pages in the vicinity of the head (for example, the first few pages) is extremely large, compared with the image data of another page, the image can be formed in a form close to collated printing.

In addition, the storage device may store image data in a form in which the image data is expanded to intermediate data. The image data received by the receiving device is stored in the storage device in a form in which the image data is expanded to intermediate data. The intermediate data may be bit map data (for example, video data) compressed every scan line according to run-length coding for actually driving the image forming device under control. The bit map data is compressed in block units composed of a predetermined number of picture elements or data shown, by combining a pointer of a character and a graphic form stored in the apparatus beforehand, to bit map data and positional data showing in which position on a recorded medium the character or the graphic form is to be output. Images can then be promptly formed by the image forming device with as small storage capacity as possible by storing image data in the form of the intermediate data. However, when an extremely large quantity of data received by the receiving device is expanded to intermediate data in any form and stored, the storage device inevitably becomes full.

In the meantime, even if the storage capacity of the storage device is full, images corresponding to all of the image data received by the receiving device can be smoothly formed as described above. Therefore, images can be more promptly formed by the image forming device.

In addition, the controller controls so as to execute collated printing so that the image forming device is driven based upon image data stored in the storage device, multiple times.

The controller controls so as to execute collated printing so that the image forming device is driven based upon image data stored in the storage device, multiple times. As described above, if the storage capacity of the storage device is full, complete collated printing is disabled. However, the image forming device can be driven so that collated printing is executed. Therefore, each part of the printed matter in which images are formed according to the invention is in the form of collated printing (even if partial) and all of the printed matter can be brought close to the form of collated printing by an extremely small adjustment. Therefore, printed matter in the form of collated printing can be more readily formed and produced.

BRIEF DESCRIPTION OF THE DRAWINGS

A preferred embodiment of the invention will be described in detail with reference to the following figures wherein:

FIGS. 10A, 10B and 10C are explanatory drawings showing the passage of printing process;

FIG. 11 is an explanatory drawing showing passage by a transformed example of the printing process; and FIGS. 12A and 12B are explanatory drawings showing other examples of passage by the transformed example of printing process.

DETAILED DESCRIPTION OF PREFERRED EMBODIMENTS

Figure 1:
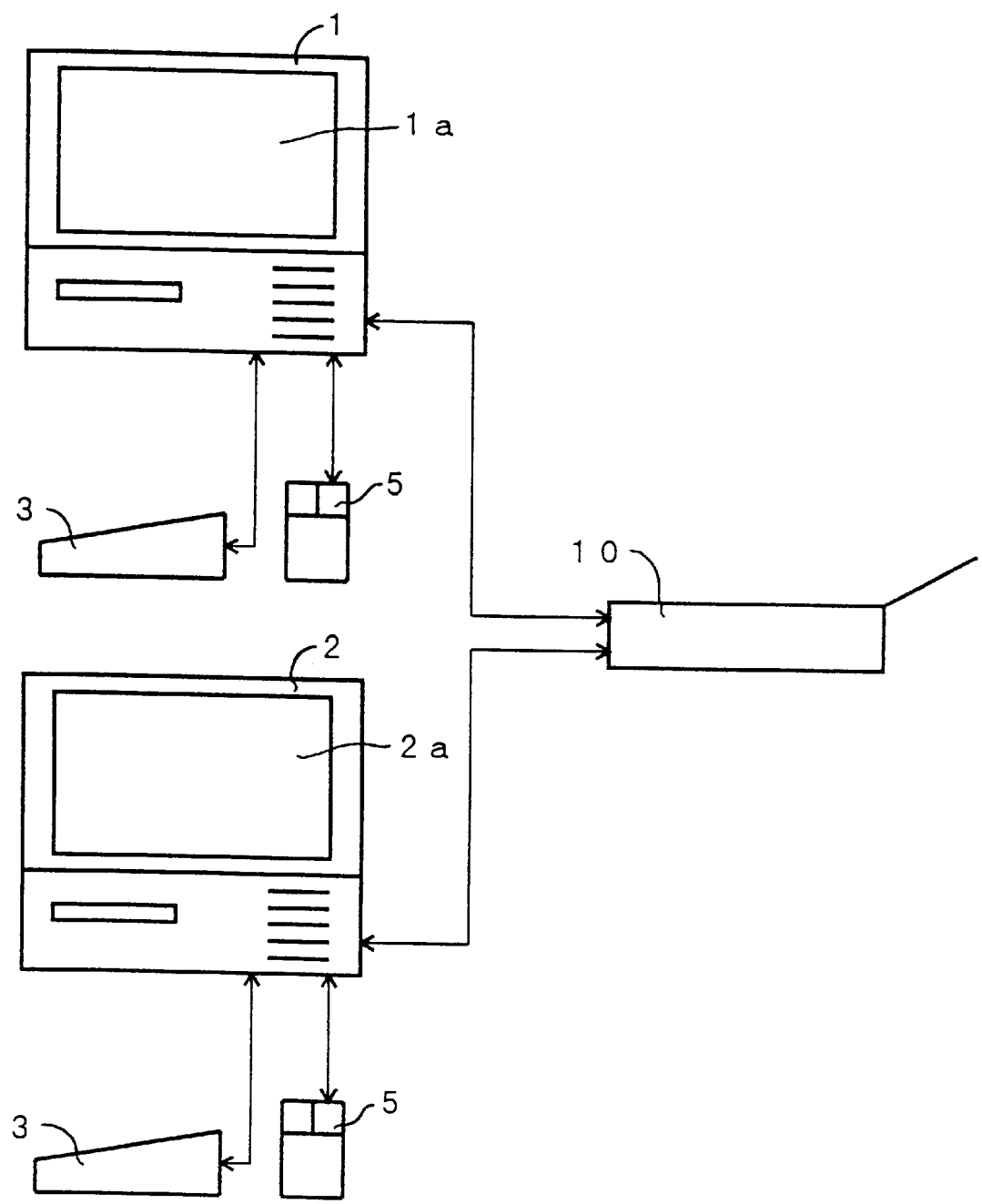
FIG. 1 illustrates the configuration of a printing system including a printer to which the invention is applied.

Next, referring to the drawings, embodiments of the invention will be described. FIG. 1 is a drawing showing the configuration of a printing system including a printer 10 as an image forming apparatus to which the invention is applied. As shown in FIG. 1, this printing system is provided with multiple host computers 1, 2 and the like, provided with a CPU, a ROM and a RAM (hereinafter, only two host computers 1 and 2 are given as an example). A keyboard 3 and a mouse 5 are respectively connected to the host computers 1 and 2. The host computers 1 and 2 share one printer 10 via a server dedicated device (not shown) and are remotely connected via a local area network (hereinafter called LAN). A user sends print data generated by his/her host computer 1 or 2 as image data to the printer 10 to execute printing processing.

The LAN may be a relatively small-scale LAN wherein the printer 10 is connected to one host computer 1 or 2 and can be also used from another host computer 2 or 1 or may be a large-scale LAN provided with a server dedicated device (a computer for a server) that serves as a print server, and the like.

Figure 2:
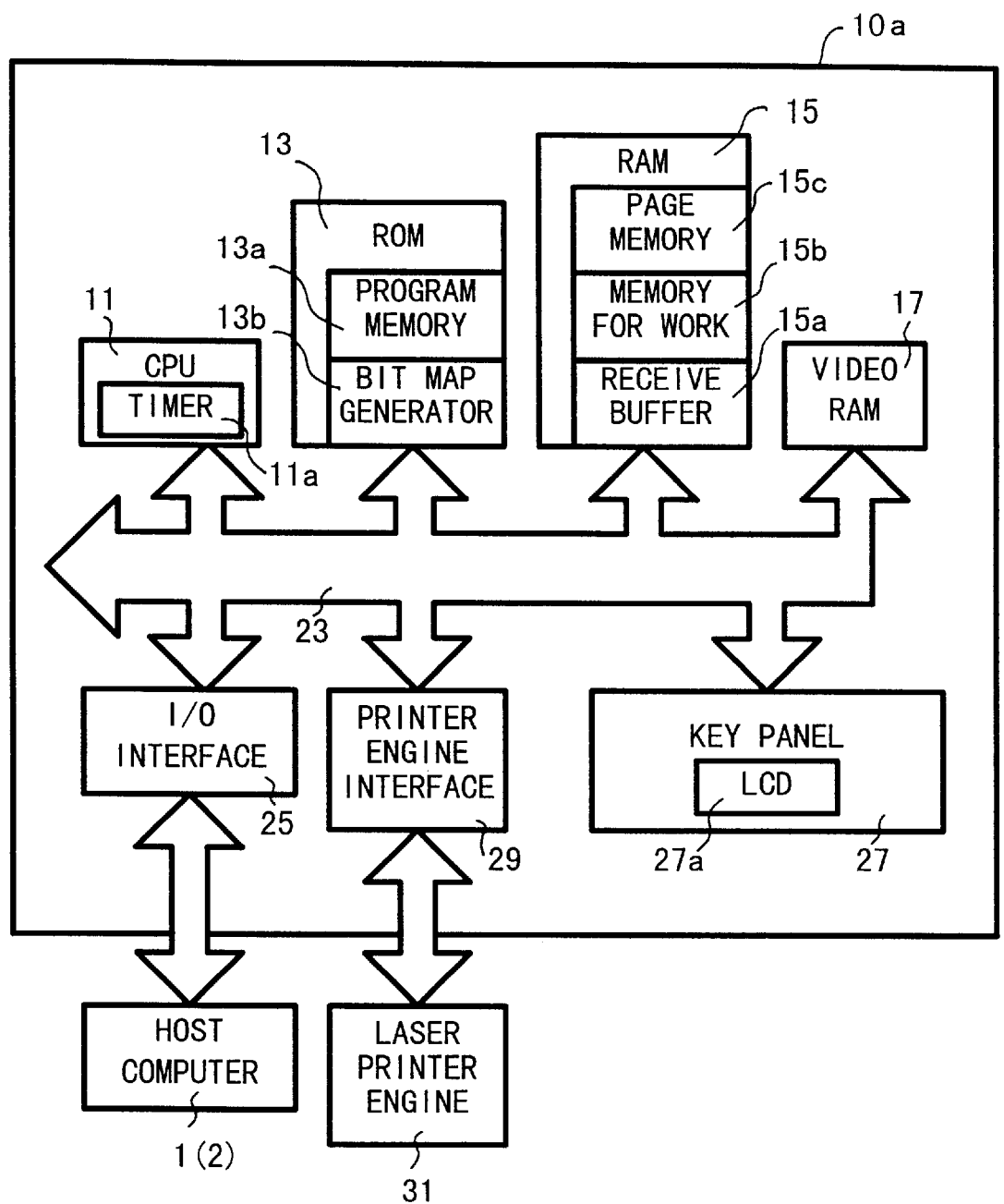
FIG. 2 is as block diagram showing the configuration of a control system of the printer.

Next, FIG. 2 is a block diagram showing the configuration of the control system of the printer 10. As shown in FIG. 2, a control unit 10a built in the printer 10 includes a microcomputer including CPU 11, ROM 13 and RAM 15. CPU 11 is provided with a timer 11a utilizing a clock signal and controls the entire printer 10. ROM 13 is provided with a program memory 13a for storing various programs described below and a bit map generator 13b for expanding intermediate data (socalled page data) stored in a page memory 15c described below, to bit-mapped video data. Further, RAM 15 is provided with a receive buffer 15a for temporarily storing print data received from an external device and the like, a memory 15b for storing intermediate data and various flags used when a program is executed and the like, and the page memory 15c for storing the above received print data (intermediate data) for each page, together with positional data, onto recording paper P equivalent to a recording medium (see FIGS. 6A and 6B).

CPU 11, ROM 13 and RAM 15 are mutually connected via a bus 23 together with video RAM 17 for temporarily storing the above video data and structured so that data can be sent or received. An input/output interface 25 for receiving print data from the host computer 1 or 2 and the like, a key panel 27 for enabling a user to provide input and a printer engine interface 29 in which a driving circuit (not shown) is built for communicating with a laser printer engine 31, are connected to the bus 23. The key panel 27 is provided with a liquid crystal display 27a for displaying the working condition and the like, of the printer 10 in addition to keys (not shown) related to setting various modes and normal printing. As the laser printer engine 31 is a well-known component, the description is omitted.

Figure 3:
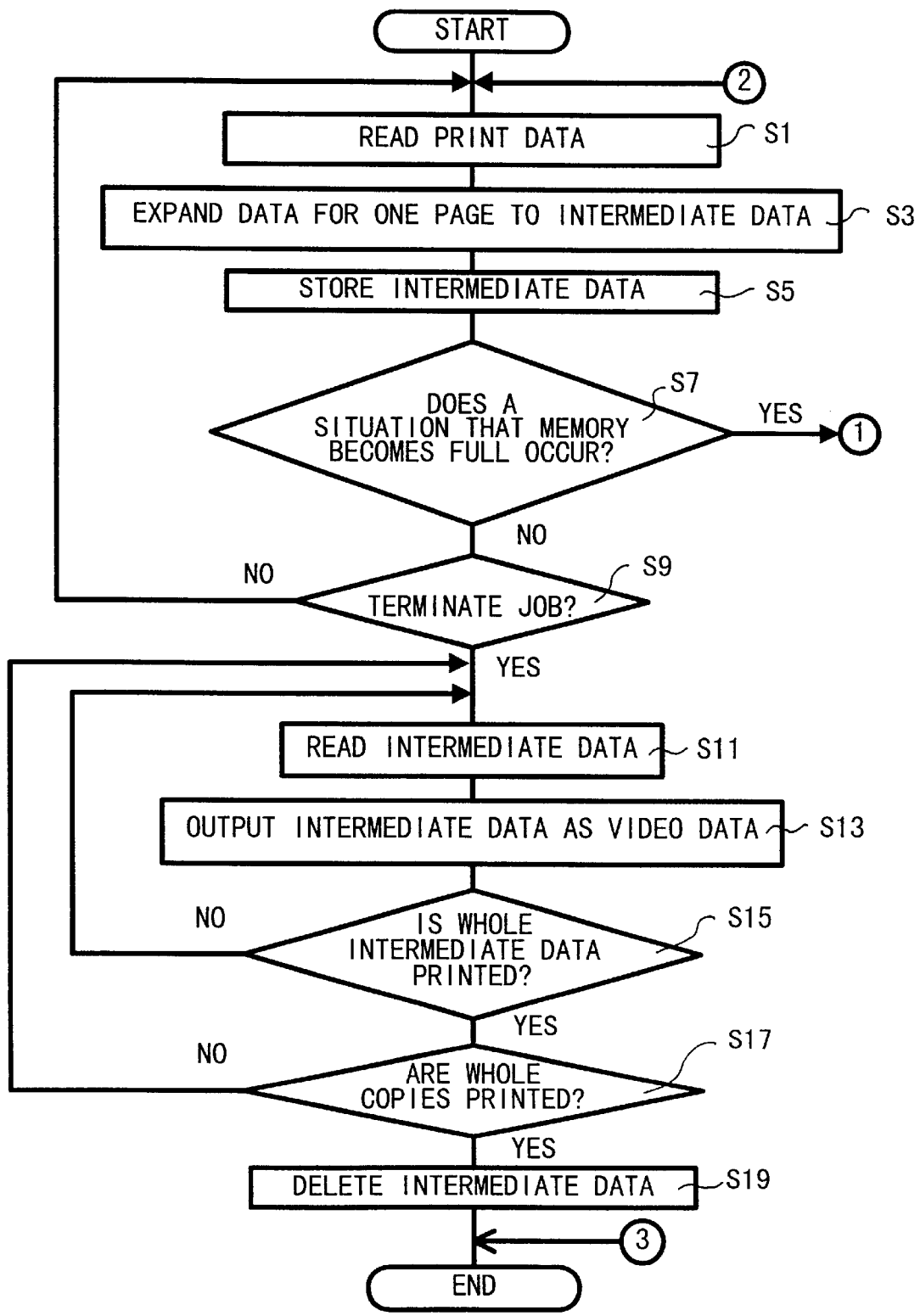
FIG. 3 is a flowchart showing the first portion of the control process executed by the control system.
Figure 4:
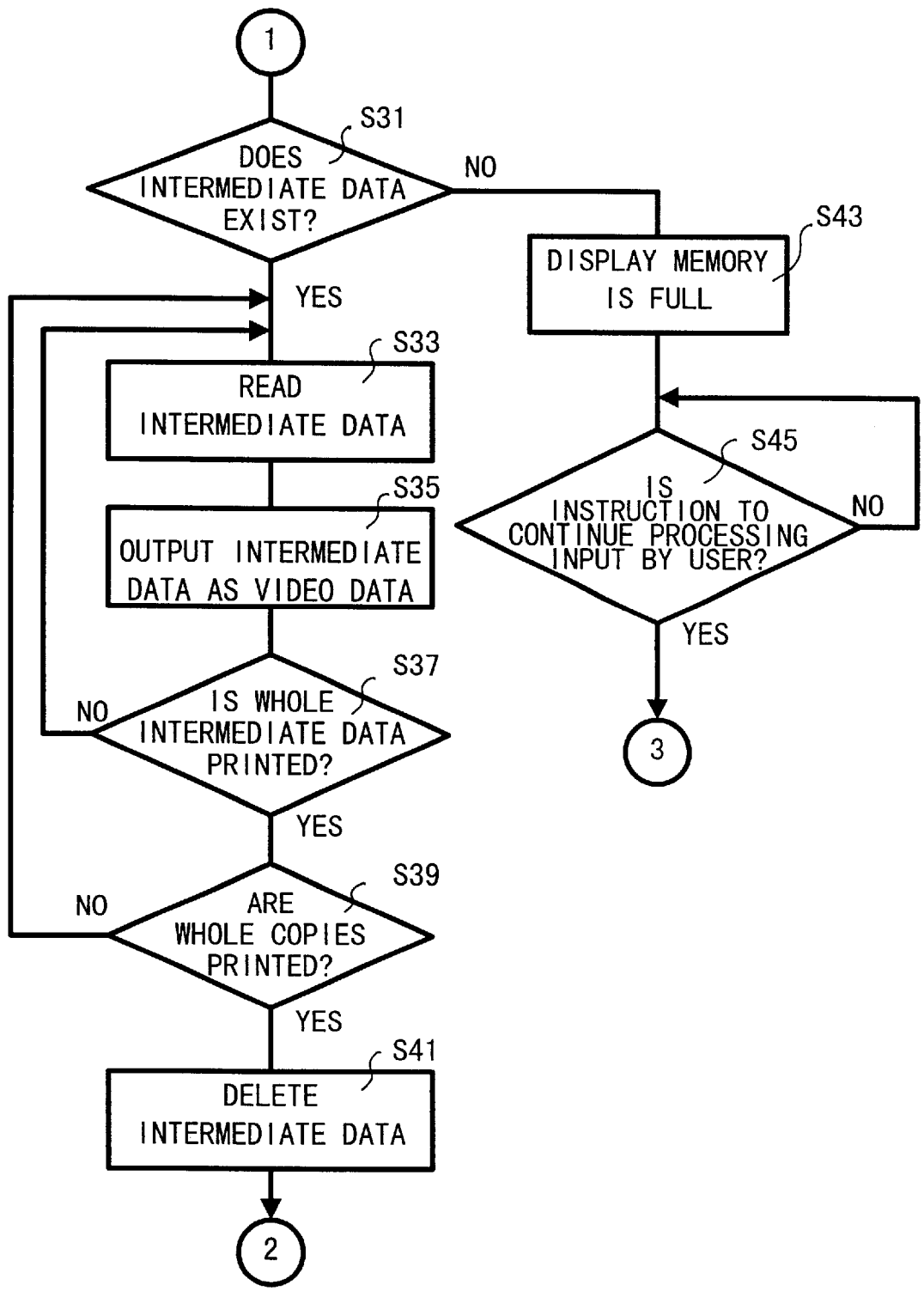
FIG. 4 is a flowchart showing the latter portion of the control process executed by the control system.

The operation of the laser printer engine 31 is controlled by the control unit 10a that outputs a driving signal based upon print data sent from the host computer 1 or 2. Next, FIGS. 3 and 4 are flowcharts showing control processing over the laser printer engine 31 executed by the control unit 10a. The process starts when the control unit 10a receives print data from the host computer 1 or 2.

Intermediate data described hereinafter, represents device bit map data compressed according to run-length coding every scan line, bit map data compressed in block units composed of a predetermined number of picture elements or data shown by combining a pointer stored in the apparatus beforehand with character data (dot data), and various graphic data and positional data showing how to relate the above pointer to a position on a recorded medium on which the character data or the graphic data is finally output.

Generally, print data in a format in which bit map data is compressed, is sent to a printer that is not provided with character data, such as font data, by the printer driver run on the host computer. Print data sent as a character code and a control code from the host computer to a printer provided with font data and the like, is often converted intermediate data.

In any form, intermediate data takes a form suitable to be printed by a printing mechanism, such as the laser printer engine 31, in a form which can be expanded to output data (video data and others) in a predetermined time, and a form in which memory capacity for storing intermediate data is as small as possible.

As shown in FIG. 3, when processing is started, first, received print data stored in the receive buffer 15a is read in S1 (S represents a step), print data for one page is sequentially converted to intermediate data in S3 and then, the converted intermediate data is sequentially stored in the page memory 15c of RAM 15 in S5. At this time, when the conversion process for one page is finished by processing a paper eject (paper feed) code and the like, information showing that intermediate data for one page is completed is stored together with a position (a storage area) of the intermediate data of the page in the page memory 15c in a management table provided in RAM 15 and shown in FIG. 5.

In S7, it is determined whether the storage capacity of the page memory 15c is full in the storage processing in S5. If the page memory 15c is not full (YES in S7), processing proceeds to S9 and it is determined whether the print job is finished, that is, whether data processing related to one document is completed. If the job is not finished (NO in S9), processing is returned to S1 and the above processing is repeated. When the processing from SI to S9 for all of the print data related to one document is completed and the job is finished (YES in S9), processing proceeds to S11 and printing is actually executed on to record paper P as follows:

First, in S11, the intermediate data stored in the page memory 15c in S5 is read, in S13 the intermediate data is expanded to video data and output to the laser printer engine 31. The laser printer engine 31 is driven by the processing and printed matter corresponding to the above print data can be formed. In S11 and S13, intermediate data is processed in a predetermined quantity corresponding to the storage capacity of the video RAM 17 and the speed of the laser printer engine 31. In S15, it is determined whether all of the intermediate data has been printed. If printing is not finished (NO in S15), processing is returned to S11 and if printing of all of the intermediate data is finished (YES in S15), processing proceeds to S17.

If processing proceeds to S11 without the page memory 15c becoming full (YES in S7), print data from the first page to the final page in the above document is expanded to intermediate data and stored in the page memory 15c. In the processing from S11 to S15, one copy of the document from the first page to the final page can be sequentially printed and stacked on individual record paper P.

When one copy of the document is printed (YES in S15) and processing proceeds to S17, it is determined whether printing of all of the preset copies is finished. If printing of multiple copies is specified, a negative determination is made when processing first proceeds to S17, processing is returned to S11 and the printing of the second copy and following copies is executed by repeating the processing from S11 to S15. When processing is returned from S17 to S11, the pointer and the like, indicating the position in which intermediate data is read, are returned to a start position. The document sequentially stacked one by one from the first page to the final page, can be printed in multiples copies by repeating the above processing. That is, above copies of documents can be printed by collating.

When all of the copies have been printed (YES in S17) and processing proceeds to S19, the printed intermediate data stored in the page memory 15c is deleted. The above deletion of intermediate data entails not actively deleting print data stored in the page memory 15c (for example, substituting null data and others) but releasing the occupied storage area by deleting the management data of the printed page from a management table showing the portion of the storage area of the page memory 15c the intermediate data of each page is stored and allowing other print data, that is, new print data, to be written in the released storage area. However, it is natural that the contents (intermediate data) themselves (itself) stored in the storage area may be also deleted (cleared) by substituting null data and the like.

In the meantime, when the page memory 15c becomes full (YES in S7) while print data is expanded to intermediate data and stored in the page memory 15c (from S1 to S9), the above collated printing is disabled. In this case, the control unit 10a makes a processing jump to S31 to execute the following processing:

First, in S31, it is determined whether intermediate data for at least one page exists in the page memory 15c. As described in relation to the above processing in S5, the above is determined based upon information (memory management data) stored in the management table in RAM 15 when the generation of intermediate data for one page is completed. If intermediate data for at least one page exists (YES in S31), processing proceeds to S33 to S37 and all of the intermediate data stored in the page memory 15c is printed as one copy as in the above S11 to S15. That is, the operation for reading the intermediate data in S33, expanding it to video data and outputting to the laser printer engine 31 in S35, is repeated until all of the intermediate data is printed in S37. If intermediate data halfway on a certain page is stored in the page memory 15c (not only the information of a page the generation of the intermediate data of which is completed but the information of a page the intermediate data of which is being generated, are stored together with information showing that the intermediate data is being generated in the above management table), printing is executed up to the page immediately before the above page in S33 to S38. That is, printing is executed based upon a series of print data for a page stored in a complete form. In S39, it is determined whether all of the above copies have been printed and if not, processing is returned to S33 and the printing of all of the intermediate data is executed for the next copy.

Images corresponding to a series of print data for pages once stored in a complete form in the page memory 15c can be printed in a collated form from S33 to S39. When the printing of the all of the copies is finished (YES in S39), the printed intermediate data is deleted in S41. The memory once full is released for any further processing. This situation will be described below, using FIGS. 5.

Figure 5A:
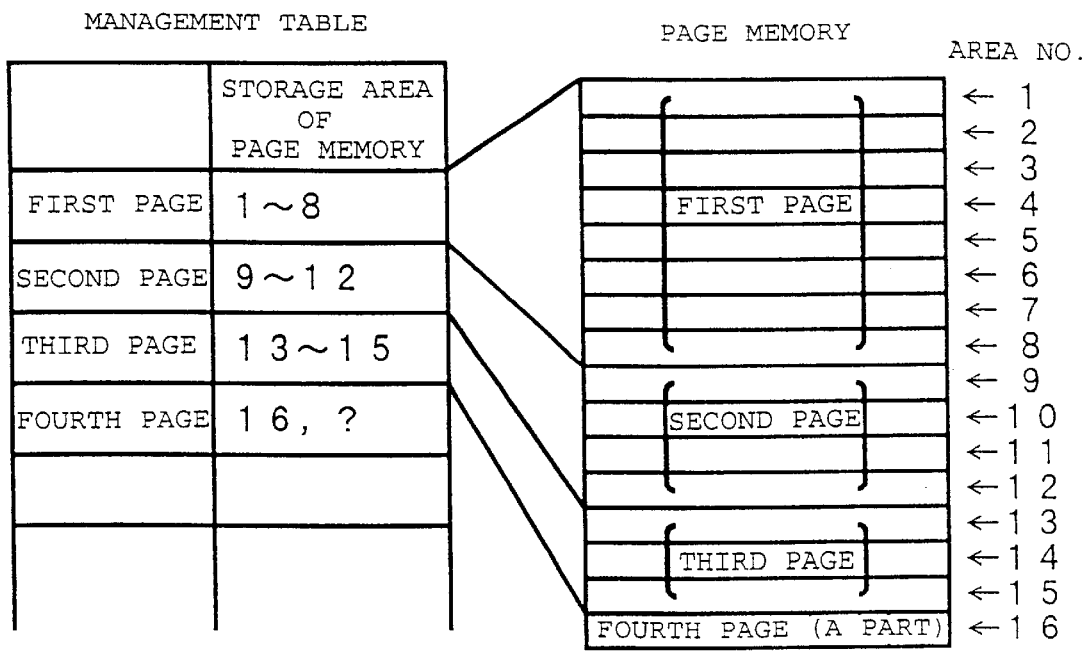
FIGS. 5A and 5B are explanatory drawings showing the deletion of intermediate data in the control process.
Figure 5B:
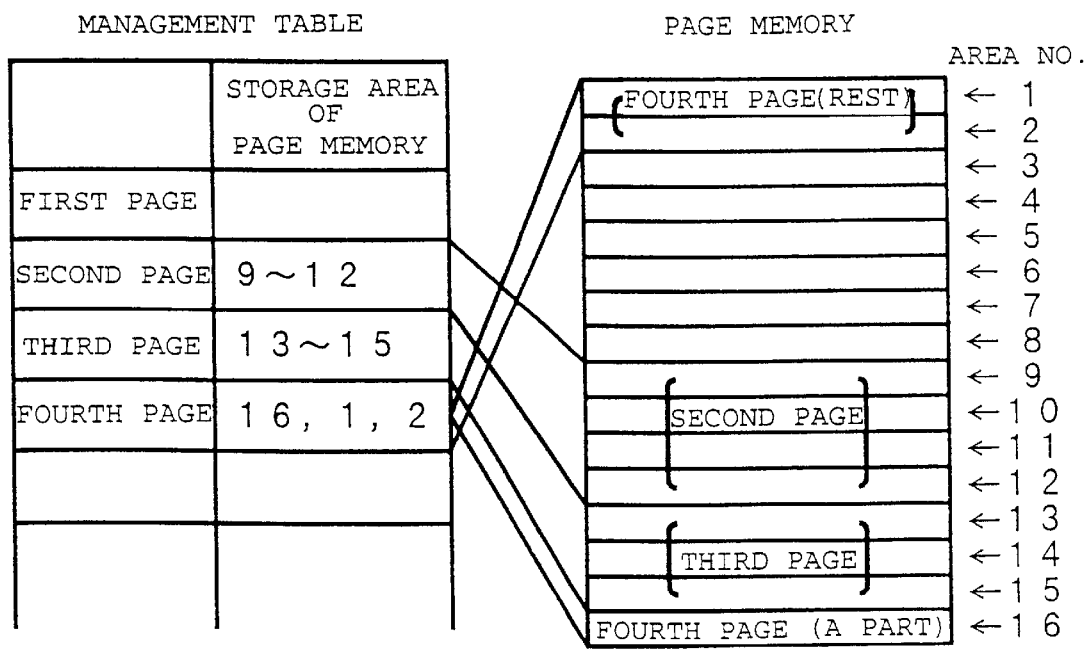

In examples shown in FIGS. 5A and 5B, the page memory 15c is provided with storage areas from No. 1 to No. 16. For a method of managing the page memory 15c, the page memory 15c is not necessarily required to be managed in block units (area number) for example, but may be also managed in units of bytes or words. As shown in FIG. 5A, suppose that in the processing from S1 to S9 until the memory becomes full, the intermediate data of the first page is stored in the storage areas from No. 1 to No. 8, the intermediate data of the second page is stored in the storage areas from No. 9 to No. 12, the intermediate data of the third page is stored in the storage areas from No. 13 to No. 15, respectively, in a complete form and when a part of the intermediate data of the fourth page is stored in the storage area of No. 16, the memory becomes full. In this case, as shown in FIG. 5B, the rest of the intermediate data of the fourth page can be stored in the storage areas of No. 1 and No. 2 by deleting the intermediate data of the first page, that is, deleting the data in the storage area corresponding to the intermediate data of the first page from the management table of the page memory 15c.

In processing in S41, memory space that was once full can be released as described above. If cases shown in FIGS. 5 are applied to this processing, the intermediate data of the first to the third pages stored in a complete form is printed in S33 to S39. Therefore, in this case, data in storage areas corresponding to the intermediate data of the first to the third pages is deleted from the management table. In S41, intermediate data may be also positively deleted.

As shown in FIGS. 3 and 4, the control unit 10a executes the above S1 to S5 next to S41 and stores the continuation of the intermediate data in the page memory 15c. If the memory does not become full (NO in S7) and the job is not yet finished (NO in S9), the next print data is further read in S1, is expanded to intermediate data in S3 and stored in the page memory 15c in S5. When the job is finished (YES in S9) without having the memory become full (YES in S7) by repeating the above processing, the next intermediate data (the intermediate data of the fourth page and the following pages in the examples shown in FIGS. 5) is printed in the collated form in S11 to S17, the intermediate data is deleted in S19 and the processing is finished. If the memory become full again (YES in S7) while the processing from S1 to S9 is repeated, print data expanded to intermediate data and stored in a complete form until the memory becomes full, is printed in the collated form by the processing from S31 to S39, and the processing from S1 to S9 is repeated again.

In the meantime, if intermediate data for one page does not exist in the page memory 15c (NO in S31) when the memory becomes full (YES in S7), a failure may occur in the print data or the page memory 15c. In this case, an error message is displayed on the liquid crystal display 27a in S43 and processing is on standby until a user inputs an instruction to continue the processing in S45. When a user inputs an instruction to continue the processing (YES in S45), the processing is terminated.

Figure 6A:
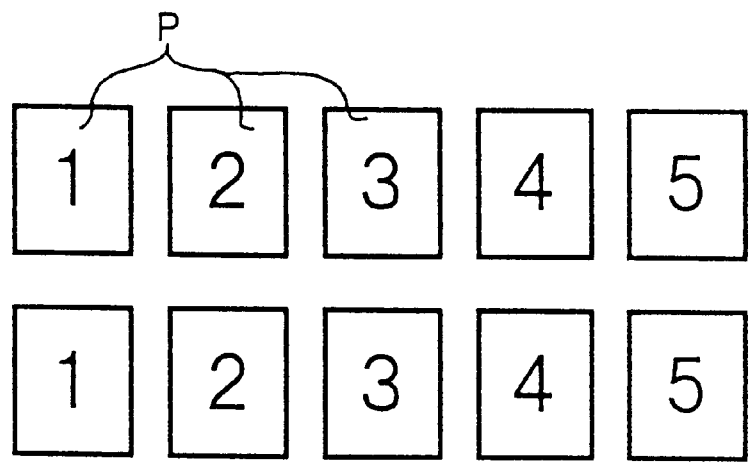
FIGS. 6A and 6B are explanatory drawings showing print configurations by the control process.
Figure 6B:
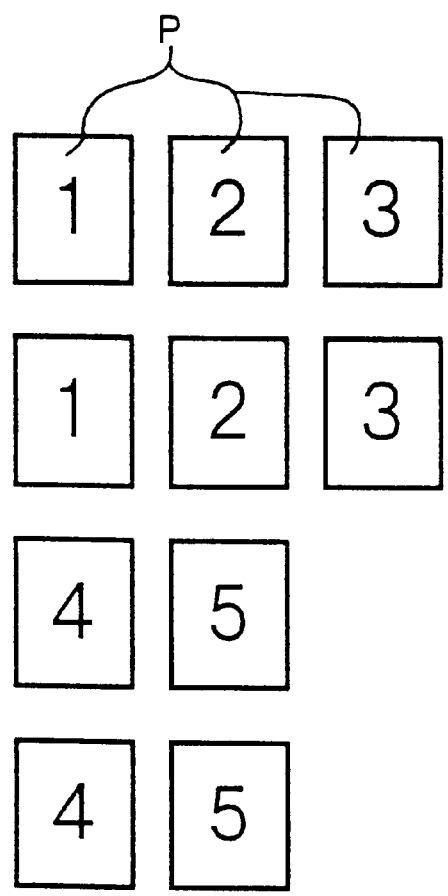

Referring to FIGS. 6 and 10, the printed form of the above document by the above processing will be described below. That is, if the memory never becomes full, images for five pages for example, can be printed on record paper P in the order of page 1, 2, 3, 4, 5, 1, 2, 3, 4 and 5 as shown in FIG. 6(A) in the form of complete collated printing (by two copies in this case) by a series of processing from S1 to S19. In the meantime, if the memory becomes full while the print data of the fourth page is expanded to intermediate data and stored, images can be printed in the order of page 1, 2, 3, 1, 2, 3, 4, 5, 4 and 5 in the form of collated printing. That is, as shown in FIG. 6B, first, images up to page 3 are printed for two copies in the form of collated printing by processing from S33 to S39 and next, the images of the fourth and fifth pages can be printed for two copies in the form of collated printing by processing from S1 to S19, assuming that the memory does not become full.

As described above, in the printer 10 equivalent to this embodiment, if the page memory 15c becomes full (YES in S7) when collated printing is executed, images corresponding to intermediate data stored at that time, are printed by the processing from S33 to S39, the printed intermediate data is deleted, and the next intermediate data is stored in S41, S1 to S9. Therefore, even if the memory becomes full, printing corresponding received print data can be smoothly executed.

FIG. 10A shows a process that after the collated printing of the first to third pages is finished, the residual print data of the fourth page and the print data of the fifth page arc received from the host computer, expanded to intermediate data, afterward, the laser printer engine 31 is activated and the collated printing of the fourth and fifth pages is executed. However, the invention is not limited to this process and as shown in FIG. 10B, the laser printer engine 31 is activated when the residual print data of the fourth page is received, expansion to intermediate data is finished, so that printing of the fourth page may also be started. That is, printing processing can be completed early by executing processing for receiving print data from the host computer, expanding it to intermediate data, and printing the data onto recording paper P by the laser printer engine 31, simultaneously in parallel using interruption processing or time sharing control, and the like. As shown in FIG. 10C, when the first page of print data is received from the host computer and expansion to intermediate data is finished, the laser printer engine 31 is activated and printing of the first page may be also executed, so that printing processing can be completed earlier.

Also in this embodiment, as the invention is applied to the printing system in which the multiple host computers 1 and 2 are connected to the printer 10, when the memory becomes full, data transmission from the other host computer 2 or 1 can be minimized and the effect of the invention is more remarkably produced. Further, in the printer 10, as print data is expanded to intermediate data, stored in the page memory 15c, and expanded to video data when printed, printing speed can be more enhanced. Therefore, the printing operation of the printer 10 can be more satisfactorily prevented from having an effect upon data transmission from the other host computer 2 or 1.

Further, in the printer 10, images corresponding to all of the received print data can be printed in a form as close to collated printing as possible. Therefore, obtained printed matter can be brought close to collated printing by an extremely small adjustment. Also in the printer 10, as intermediate data for pages stored in a complete form is printed in the form of collated printing when the memory becomes full, a user can know that the memory becomes full when print data is expanded to intermediate data up to a particular page. Therefore, a user can also delimit print data in a suitable location when similar (or similar amount) print data is sent to the printer 10 again or expand the page memory 15c. That is, the printer 10 can provide a guide when the similar print data is sent again by a user.

The page in the above embodiment is also considered an image formation unit (an image output unit) in the image forming apparatus (the printer 10) and if printing is executed on one side of the recording paper (a recorded medium) P, the page means the one side and in the case of double sided printing in which printing is executed on both sides of the recording paper P, a page means a pair of sides equivalent to both sides. In the case of dual page printing, that is, if one recorded medium is divided into two parts in the center and printing is executed on two pages, the image data for two pages printed on one sheet of recording paper P, composes one image formation unit.

The invention is not limited to the above embodiment and various embodiments are allowed within a range in which the aspects of the invention are not deviated. For example, when the memory becomes full, various printing forms may be devised. In examples shown in FIG. 7A and FIG. 11, preset multiple copies of only the first page are printed and then, after the intermediate data of the first page is deleted, the residual pages are printed in the form of collated printing. Such processing can be readily executed by changing the determination in S37 in FIG. 4 of whether printing of all of the intermediate data is finished to the determination of whether the printing of the first page is finished.

As the printer 10 outputs a busy signal to the host computer to instruct the host computer to interrupt the sending of the residual data when the storage capacity of the page memory 15c becomes full, the host computer cannot complete the sending of print data and is kept on standby while printing continues. At this time, if printing corresponding to print data for one page is completed, new print data can be stored in the page memory 15c and receiving data from the host computer can be restarted.

That is, as time required for the following printing is fairly long if all of the copies for pages stored in a complete form when the storage capacity of the page memory 15c becomes full, are printed, a situation that the host computer is required to wait for a long time although a small quantity of data is left may occur. However, if even the printing processing of one page is finished earlier, the possibility that the host computer can be released earlier is high. For example, the possibility that a small amount of data cannot be sent, although printing is completed when the small amount of data is sent, is reduced. Therefore, the image forming apparatus can start new data receiving processing for the next print job sent from the host computer earlier.

Figure 7A:
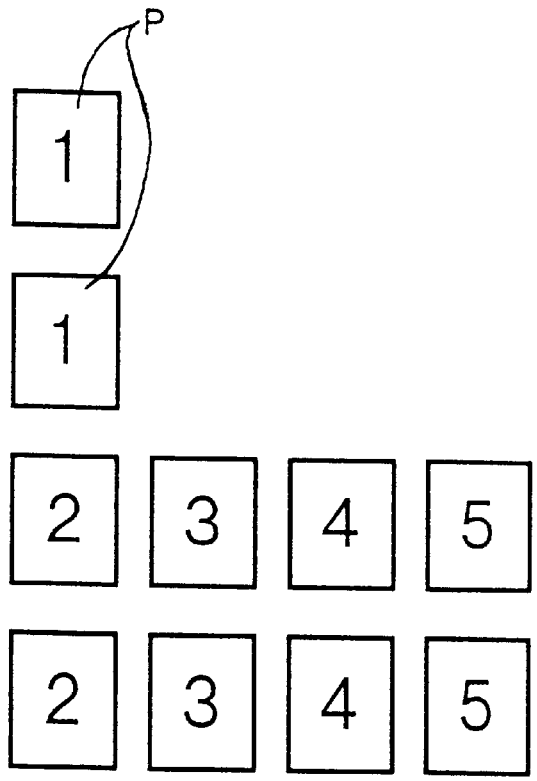
FIGS. 7A and 7B are explanatory drawings showing print configurations by a transformed example of the control process.

In addition, in general printed matter, relatively complicated decorative images are often printed on a first page to attract attention. In such printed matter, print data corresponding to images on the first page may be extremely large, compared with image data for another page. In this case, print data of all of the pages except for the print data of the first page, is expanded to intermediate data and can be all stored in the page memory 15c. If a print form shown in FIG. 7A is adopted for such printed matter, the second page and all of the following pages, can be printed in the form of collated printing although the multiple copies of the first page are continuously printed. Therefore, all of the printed matter can be brought close to the form of collated printing by an extremely small adjustment.

Figure 7B:
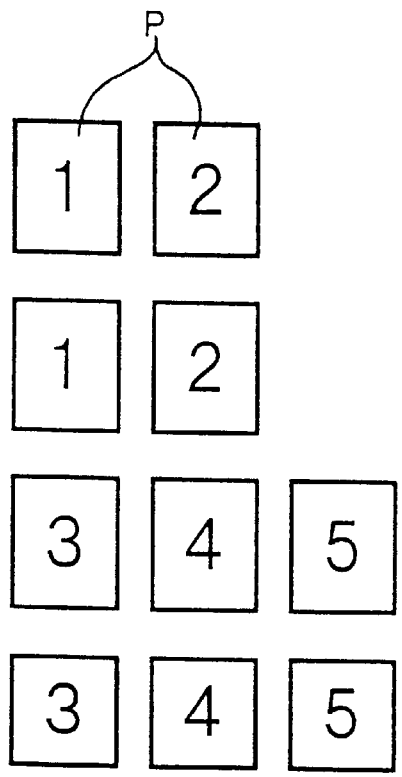

As shown in FIG. 7B, the first and second pages are printed in the form of collated printing and after the intermediate data of those pages is deleted, the residual pages may be also printed in the form of collated printing. In the instruction manuals and others of various equipment, decorative images for attracting attention are often printed on the first page, graphic forms such as a part drawing are printed on the second page, and print data composed of characters which can be relatively readily compressed is printed on the residual pages. In such printed matter, if a print format shown in FIG. 7B is adopted, the print format can be brought close to the form of collated printing by less of an adjustment. In this case, the printer 10 can also start receiving new data for the next print job earlier, compared with the cases shown in FIGS. 10.

Figure 8:
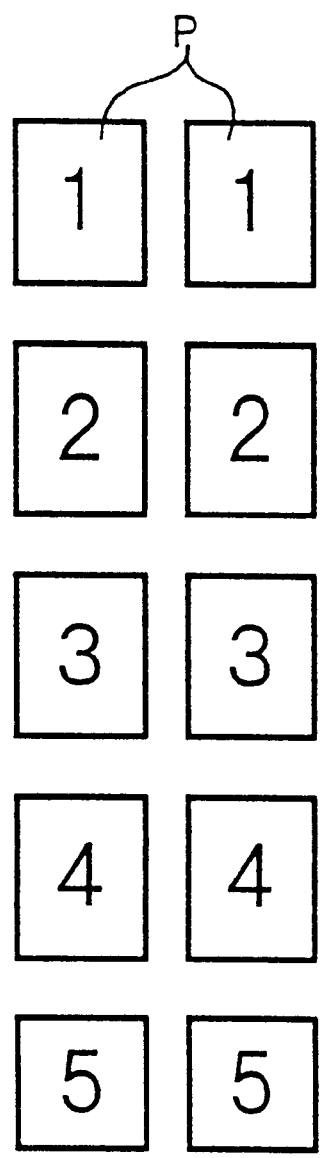
FIG. 8 is an explanatory drawing showing a print configuration by another transformed example of the control process.

Further, if the memory becomes full when collated printing is executed as shown in FIG. 8, preset copies of images may also be switched to so-called stack printing in which printing is executed for every page. Such processing can be readily executed by proceeding to a well-known routine for stack printing if an affirmative determination is made in S7 in FIG. 3.

If S37 in FIG. 4 is changed as described above to execute the print form shown in FIG. 7(A), the following printing may be also executed depending upon a state in which print data is dispersed in each page: That is, if for the first page, multiple copies are printed and the memory becomes full again when the second page and following pages are printed in the form of collated printing, multiple copies of the second page are printed. If print data in the first page for example, in the vicinity of the head is extremely large, compared with print data in another page, collated printing is enabled when the printing of the page in the vicinity of the head is finished and the print form is changed to a print form like the one shown in FIG. 7(B). In this case, the print form can be brought relatively close to the form of collated printing. However, if print data is uniformly scattered in the whole printed matter, the memory may become full many times, as shown in FIG. 12(A), and the print form may be a print form approximately similar to stack printing shown in FIG. 8, as a result. In such a case, if the similar print form to that shown in FIG. 6B, is adopted after multiple copies are printed for the first page, printing may be executed in a print format close to collated printing.

Figure 9:
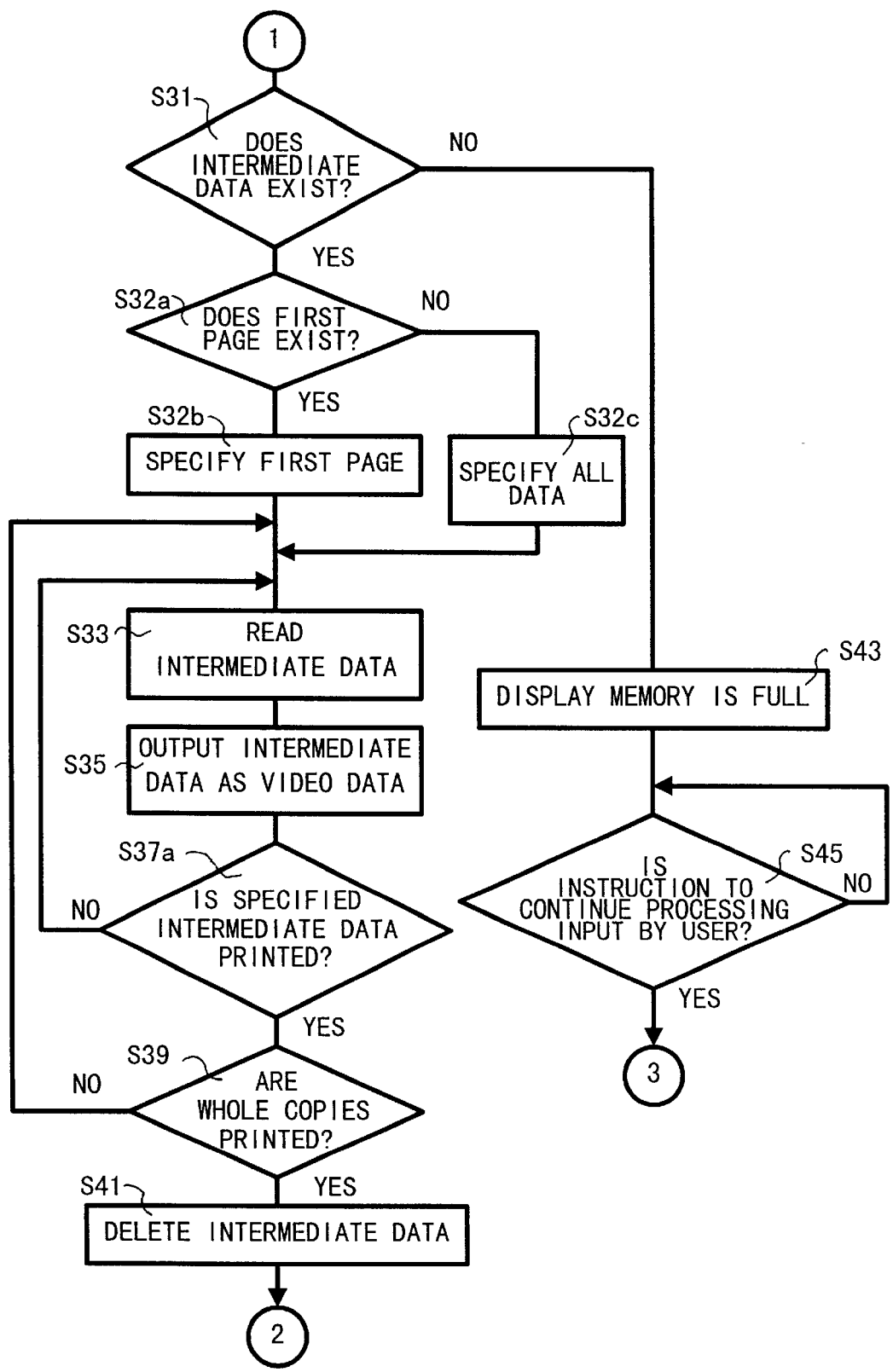
FIG. 9 is a flowchart showing another transformed example of the control process.

FIG. 9 is a flowchart showing processing for executing such a print form. This processing is similar to the processing in S4 except that processing in S32a, S32b and S32c is inserted between S31 and S33 and the following S37a is substituted for S37. Only the different points will be described below.

If the memory becomes full (YES in S7) and intermediate data for at least one page exists in the page memory 15c (YES in S31), it is determined in S32a based upon information in the management table, whether the intermediate data of a first page exists in the intermediate data. If the intermediate data of the first page exists (YES in S32a), the first page is specified in S32b, if the intermediate data of the first page does not exist (NO in S32a), all of the data is specified in S32c and processing proceeds to in S33 and the following steps. In S37a replaced with S37, it is determined whether the printing of intermediate data specified in S32b or S32c is finished.

Therefore, if the data of the first page exists in intermediate data (YES in S32a), an affirmative determination is made in S37a after the first page is printed in S33 and S35, processing proceeds to S39 and the printing of multiple copies is executed. If no intermediate data of the first page exists, that is, in the case of the printing of the second page and the following pages (NO in S32a), printing of all of the pages stored in a complete form is executed in S37a by repeating the processing in S33 and S35 and the printing is executed by multiple copies in S39.

FIG. 12B shows an example if such processing is executed and the print form can be brought readily close to the form of collated printing, compared with the case shown in FIG. 12A. However, considering that the host computer can be released early, the case shown in FIG. 12A is advantageous. Therefore, it is desirable that it is not selected which method for all types of print data is excellent but even if either is selected by a user, both methods are kept executable. This is also similar to whether the processing shown in FIGS. 10A and 10B is to be executed or the processing shown in FIGS. 12A and 12B is to be executed if the memory becomes full first, and it is desirable that a user can arbitrarily select such processing.

Further, for embodiments of the invention, various embodiments such as printing executed in the above print form if the memory becomes full when intermediate data is read and printing is executed, are allowed. In addition, a printer engine according to an ink-jet method and a thermal head method is used in place of the laser printer engine 31 are allowed. However, if the memory becomes full in the image forming apparatus when image data, such as print data, is expanded to intermediate data and stored, the image forming apparatus is halted mainly because the memory becomes full. In the above embodiments, as the invention is applied to a situation that the page memory 15c becomes full caused when intermediate data is stored, the effect of the invention is more remarkably produced.

The determination of whether the memory has become full in the above embodiments, that is, the determination of whether the above situation occurs in S7 in FIG. 3, is not limited to the above determination and may be also executed as follows: For example, intermediate data this time can be stored in S5. However, even if there is no vacant memory area for storing the next intermediate data, it may be also determined in S7 that the memory becomes full. This is effective in case intermediate data has a format of a predetermined size.

In S7, it may be also determined that the memory becomes full if the residual capacity is a predetermined quantity or less. This is effective in case the predetermined quantity is set to approximately the maximum size of the intermediate data, so that a situation where print data converted to intermediate data cannot be stored in the memory, may be prevented, and the like.

Further, if space in the memory 15b is short not only when intermediate data is stored in the page memory 15c but when the intermediate data is generated in S3, it may be also determined in S7 that the memory has become full without executing the processing in S5. In a system in which memories are managed so that the page memory 15c and the memory 15b are utilized as a part of common memory space in RAM 15, when the page memory 15c is released when printing is finished, a part of an area used for the released page memory 15c can be allocated as an area for the memory 15b. Then, the possibility that the processing of the next page can be continued is enhanced and the similar effect to a measure for a case that the page memory 15c becomes full can be obtained.

When intermediate data stored in the page memory 15c at that time is released by executing printing processing, not only in a system in which such dynamic memory allocation is executed but in case the memory 15b fixedly allocated is short on space, a part of the memory 15b used for the printed page can be released. As a result, the processing in S3 for generating intermediate data using the memory 15b for the next print data is enabled and the possibility that the next printing of copies can be completed, is enhanced. This is particularly effective in case intermediate data is formed by combining a pointer showing bit map data (generally, called cache data) temporarily generated in the memory 15b for a character and a graphic form and positional data, and it is because the above cache data used for the printed page may be deleted (the memory area may be released) after printing.

What is claimed is:

1. An image forming apparatus, comprising:
    an image forming device that forms an image onto a recording medium based upon image data;
    a receiving device that receives the image data;
    a storage device that stores the image data received by the receiving device; and
    a controller that controls the storage of all of the image data received by the receiving device in the storage device, and controls the driving of the image forming device multiple times if multiple copies of images corresponding to the image data are required to be formed,
    wherein when a storage capacity of the storage device becomes full while all of the image data received by the receiving device is stored in the storage device, the controller controls the driving of the image forming device multiple times if multiple copies of images corresponding to the image data are required to be formed based upon a quantity of image data stored in the storage device, deletes the quantity of image data after the image forming device forms the images onto the recording medium, and stores a continuation of the remaining received image data in the storage device.

2. The image forming apparatus according to claim 1, wherein the quantity of image data is at least one page previously stored in the storage device.

3. The image forming apparatus according to claim 1, wherein the quantity of image data is a series of image data for pages stored in their entirety in the storage device.

4. The image forming apparatus according to claim 1, wherein the quantity of the image data is a first page already stored in the storage device.

5. The image forming apparatus according to claim 1, wherein the storage device stores the image data in a form in which the image data is expanded into print data.

6. The image forming apparatus according to claim 1, wherein the controller controls the driving of the image forming device multiple times based upon image data stored in the storage device so as to execute collated printing.

7. An image forming method, comprising:
    forming an image onto a recording medium based upon image data, wherein images are formed multiple times if multiple copies of images corresponding to the image data are required to be formed;
    receiving the image data;
    storing the received image data in a storage device; and controlling the storage of all of the received image data in the storage device;

wherein when a storage capacity of the storage device becomes full while all of the image data received in the receiving step is stored in the storage device, the forming step is performed multiple times if multiple copies of images corresponding to the image data are required to be formed based upon a quantity of image data stored in the storage device, the quantity of image data is deleted from the storage device after forming the multiple copies of the images onto the recording medium, and a continuation of the remaining received image data is stored in the storage device.

8. The image forming method according to claim 7, wherein the quantity of image data is at least one page previously stored in the storage device.

9. The image forming method according to claim 7, wherein the quantity of image data is a series of image data for pages stored in their entirety in the storage device.

10. The image forming method according to claim 7, wherein the quantity of the image data is a first page already stored in the storage device.

11. The image forming method according to claim 7, wherein the image data is stored in the storage device in a form in which the image data is expanded into print data.

12. The image forming method according to claim 7, wherein the driving step drives the forming step multiple times based upon image data stored in the storage device so as to execute collated printing.

13. A storage medium for storing programs to operate the image forming apparatus according to claim 1, comprising:

a program for forming the image onto the recording medium based upon the image data, wherein images are formed multiple times if multiple copies of images corresponding to the image data are required to be formed;

a program for receiving the image data;

a program for storing the received image data in the storage device; and a program for controlling the storage of all of the received image data in the storage device;

wherein when the storage capacity of the storage device becomes full while all of the image data received by the receiving device in the receiving step is stored in the storage device, the program for forming is performed multiple times if multiple copies of images corresponding to the image data are required to be formed based upon the quantity of image data stored in the storage device, the quantity of image data is deleted from the storage device after the image forming device forms the image onto the recording medium, and the continuation of the remaining received image data is stored in the storage device.

14. The storage medium according to claim 13, wherein the quantity of image data is at least one page previously stored in the storage device.

15. The storage medium according to claim 13, wherein the quantity of image data is a series of image data for fully stored pages stored in the storage device.

16. The storage medium according to claim 13, wherein the quantity of the image data is a first page already stored in the storage device.

17. The storage medium according to claim 13, wherein the image data is stored in the storage device in a form in which the image data is expanded into print data.

18. The storage medium according to claims 13, wherein the program for forming is performed multiple times based upon image data stored in the storage device so as to execute collated printing.

* * * * *